(12) United States Patent
Riggi et al.

(10) Patent No.: US 9,516,444 B2
(45) Date of Patent: Dec. 6, 2016

(54) WIRELESS CONTROL AND CALIBRATION OF AUDIO SYSTEM

(71) Applicant: SONAVOX CANADA INC., Woodbridge (CA)

(72) Inventors: Giuseppe Riggi, Woodbridge (CA); Jeliazko S. Batchvarov, Woodbridge (CA)

(73) Assignee: SONAVOX CANADA INC., Woodbridge (CA)

( * ) Notice: Subject to any disclaimer, the term of this patent is extended or adjusted under 35 U.S.C. 154(b) by 0 days.

(21) Appl. No.: 14/600,037

(22) Filed: Jan. 20, 2015

(65) Prior Publication Data

US 2016/0021473 A1 Jan. 21, 2016

Related U.S. Application Data

(60) Provisional application No. 62/024,796, filed on Jul. 15, 2014.

(51) Int. Cl.
| | |
|---|---|
| *H04R 29/00* | (2006.01) |
| *H04R 3/04* | (2006.01) |
| *G06F 3/16* | (2006.01) |
| *H04R 3/00* | (2006.01) |
| *H04W 4/00* | (2009.01) |
| *H04S 7/00* | (2006.01) |

(52) U.S. Cl.
CPC ............ *H04R 29/001* (2013.01); *G06F 3/165* (2013.01); *H04R 3/00* (2013.01); *H04R 3/04* (2013.01); *H04W 4/008* (2013.01); *H04R 2420/07* (2013.01); *H04S 7/301* (2013.01)

(58) Field of Classification Search
None
See application file for complete search history.

(56) References Cited

U.S. PATENT DOCUMENTS

| | | | |
|---|---|---|---|
| 2011/0116642 A1 | 5/2011 | Hall et al. | |
| 2012/0237037 A1 | 9/2012 | Ninan et al. | |
| 2013/0066453 A1 | 3/2013 | Seefeldt | |
| 2014/0003625 A1 | 1/2014 | Sheen et al. | |
| 2014/0109138 A1* | 4/2014 | Cannistraro | ........ H04L 12/2809 725/37 |

FOREIGN PATENT DOCUMENTS

| | | |
|---|---|---|
| WO | 2014032709 A1 | 3/2014 |
| WO | 2014040667 A1 | 3/2014 |

OTHER PUBLICATIONS

Anonymous: "Apple TV (3rd generation): Using an iOS device to set up your Apple TV", Sep. 24, 2013 (Sep. 24, 3013), XP05513 3108, Retrieved from the Internet: https://web.archive.org/web/20130928072045/http://support.apple.com/kb/HT5900.
Corresponding Canadian Patent Application No. 2878820 Examination Report dated Sep. 14, 2015.
Corresponding European Patent Application No. 15152829.6 Search Report dated Jul. 20, 2015.

* cited by examiner

*Primary Examiner* — Muhammad N Edun
(74) *Attorney, Agent, or Firm* — Perry + Currier inc.

(57) ABSTRACT

An audio system includes an enclosure, a speaker disposed in the enclosure, an audio source for providing an audio signal, and a controller. The controller is connected to the speaker and configured to drive the speaker according to the audio signal. The audio system further includes a wireless personal area network interface connected to the controller. The wireless personal area network interface can communicate with a wireless mobile device to effect settings changes for the audio system and to perform calibration for the audio system. Calibration can include near and far measurements using the microphone of the wireless mobile device.

10 Claims, 8 Drawing Sheets

WIRELESS CONTROL AND CALIBRATION OF AUDIO SYSTEM

FIELD

The present invention relates to audio systems, such as subwoofers, speakers, and systems that include such.

BACKGROUND

It is often the case that audio systems suffer from a lack of convenient control and setup functionality. This is particularly the case for box-on-floor devices, such as subwoofers. Casual listeners often do not read the manual or explore control and setup functionality for their systems. A system may have a high degree of functionality, but this can be wasted for lack of simple and effective usability. And while proper control and setup can greatly improve system performance, there remains a need to provide such in a convenient manner without sacrificing accuracy and quality.

SUMMARY

According to one aspect of the present invention, an audio system includes an enclosure, a speaker disposed in the enclosure, an audio source for providing an audio signal, and a controller at the enclosure. The controller is connected to the speaker and configured to drive the speaker according to the audio signal. The system further includes a wireless personal area network interface connected to the controller.

The controller can be configured to communicate via the wireless personal area network interface with an application executed by a wireless mobile device.

The wireless mobile device can include a microphone and the application can be configured to control the microphone to sample calibration audio outputted by the speaker during an in-room calibration routine executed by the controller.

The wireless mobile device can include a smartphone or a tablet computer.

The wireless personal area network interface can include a Bluetooth Low Energy interface.

The controller can store an in-room calibration routine, and the controller can be configured to execute the in-room calibration routine in response to a command received at the wireless personal area network interface.

The controller can be configured to perform equalization on the audio signal according to calibration data generated by the in-room calibration routine and stored at the controller.

The in-room calibration routine can include a near measurement and a far measurement, the near measurement for ascertaining an audio response of a microphone of a wireless mobile device, the far measurement for determining in-room response of the speaker with respect to the near measurement.

The system can further include at least one other speaker connected to the controller, the controller being further configured to drive the at least one other speaker.

The speaker can be a subwoofer.

According to another aspect of the present invention, a method includes wirelessly connecting a controller of the speaker to a wireless mobile device over a wireless network, the controller executing an in-room calibration routine, including controlling the speaker to output calibration audio, a microphone of the wireless mobile device sampling the calibration audio and wirelessly transmitting representations of samples of the calibration audio to the controller, and the controller storing generating calibration data from the samples and storing the calibration data for performing equalization for the speaker.

The controller executing an in-room calibration routine can further include controlling the speaker to outputting the calibration audio when the wireless mobile device is situated at a location at a near distance to the speaker, and controlling the speaker to outputting when the wireless mobile device is situation at a location at a far distance from the speaker, the far distance being greater than the near distance.

The method can further include the wireless mobile device issuing a user instruction to move the wireless mobile device from the near distance to the far distance.

According to another aspect of the present invention, an audio system includes an enclosure, a speaker disposed in the enclosure, an audio source for providing an audio signal, and a controller at the enclosure. The controller is connected to the speaker and configured to drive the speaker according to the audio signal. The system further includes a wireless personal area network interface connected to the controller, the wireless personal area network interface including a Bluetooth Low Energy interface. The controller is configured to communicate via the wireless personal area network interface with an application executed by a wireless mobile device that includes a microphone. The application is configured to control the microphone to sample calibration audio outputted by the speaker during an in-room calibration routine executed by the controller. The controller is further configured to execute the in-room calibration routine in response to a command received at the wireless personal area network interface. The controller is further configured to perform equalization on the audio signal according to calibration data generated by the in-room calibration routine and stored at the controller. The in-room calibration routine includes a near measurement and a far measurement, the near measurement for ascertaining an audio response of the microphone of the wireless mobile device, the far measurement for determining in-room response of the speaker with respect to the near measurement.

BRIEF DESCRIPTION OF THE DRAWINGS

The drawings illustrate, by way of example only, embodiments of the present disclosure.

DETAILED DESCRIPTION

The present invention is directed to wirelessly interfacing with an audio system using a wireless mobile device, such as a smartphone or tablet computer. Settings for the audio system can be wirelessly controlled. In-room calibration for the audio system can be performed using the factory microphone of the wireless mobile device. During calibration, output of the audio system can be measured at near and far locations to account for microphone and room characteristics, which may be otherwise unknown.

Figure 1:
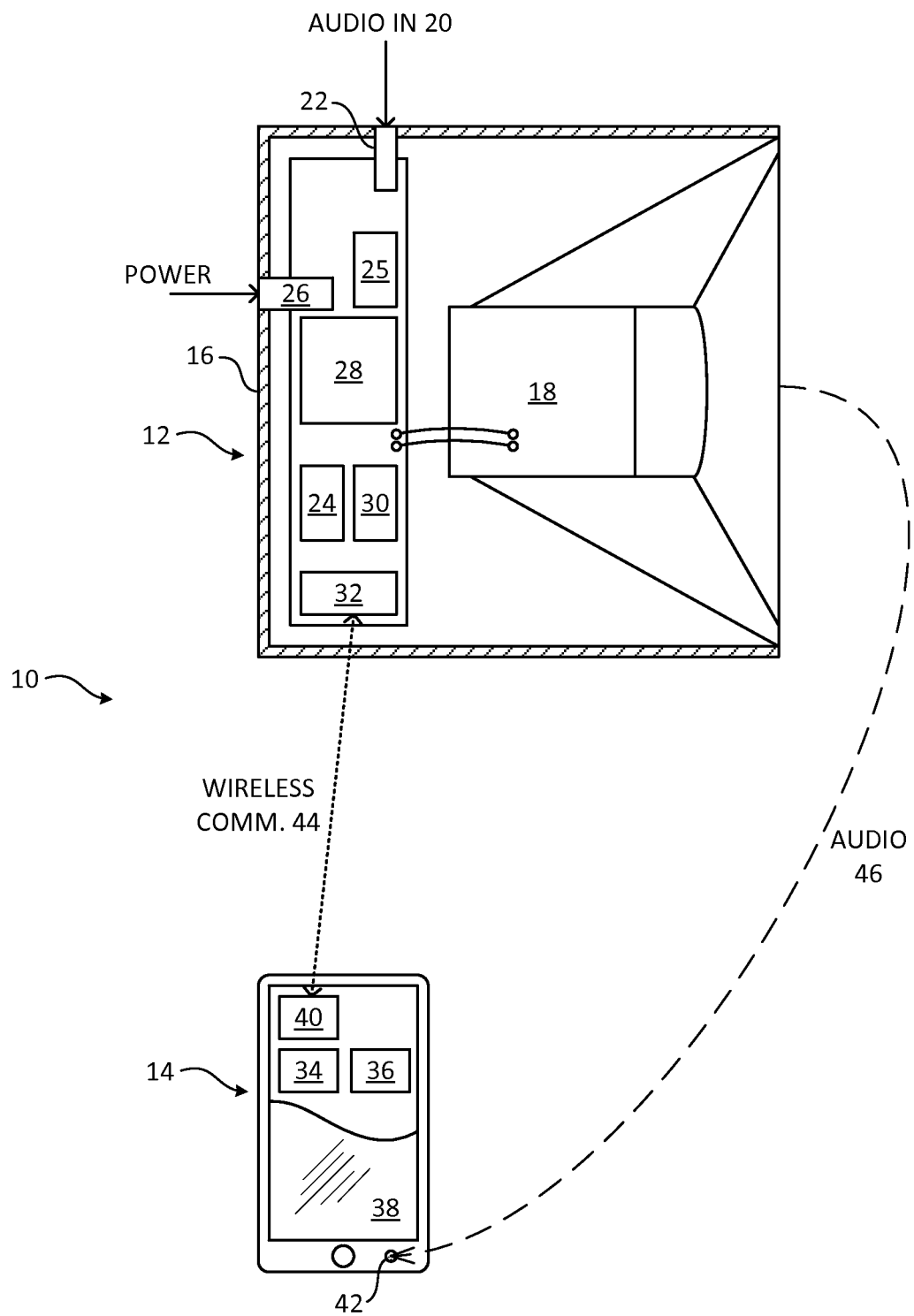
FIG. 1 is a block diagram of system according to the present invention.

FIG. 1 shows a system 10 according to the present invention. The system 10 includes an audio system 12 and a wireless mobile device 14.

In the present embodiment, the audio system 12 is a subwoofer. In other embodiments, the audio system can include any combination of speakers (e.g., woofers, midrange drivers, tweeters, etc.), a tuner, a media player (e.g., CD, DVD, etc.), amplifiers/pre-amplifiers, a turntable, an A/V receiver, a display device, and similar components. The audio system 12 can be a single, monolithic component, such as a subwoofer, clock radio, or a tabletop stereo system.

The audio system 12 includes an enclosure 16 shaped and sized to protect internal components and to provide desired audio characteristics, such as resonance, frequency response, and the like. The enclosure 16 can be made of any suitable material, such as wood, plastic, metal, or a combination of such.

The audio system 12 further includes a speaker 18 disposed in the enclosure 16. The speaker 18 is an electromechanical component that includes various elements for converting electrical signals to audio, such as a voice coil, a magnet, and a cone. The speaker 18 may include other elements such as a frame, a surround, a spider, a dust cap, top/bottom plates, and the like. As mentioned, in this embodiment, the speaker 18 that of a subwoofer.

The audio system 12 further includes an audio source for providing an audio signal 20 for playback. The audio signal 20 may include signals in one or more frequency channels or bands. In this embodiment, the audio source is an audio input port 22 for receiving a low-frequency audio signal 20 from an external component. In other embodiments, the audio signal 20 may originate from a source within the enclosure 16.

The audio system 12 further includes a controller 24 situated inside the enclosure 16. The controller 24 is connected to the speaker 18 and is configured to drive the speaker 18 according to the audio signal 20. The controller 24 can include a microcontroller, a central-processing unit (CPU), a programmable logic gate array (e.g., an FPGA), a fixed logic gate array, or similar.

The audio system 12 may further include a digital signal processor (DSP) 25, a power connector 26, one or more amplifiers 28, and non-volatile memory 30 (e.g., flash memory or similar). The DSP 25 is configured to process input audio signals 20 for output via the amplifier 28 and speaker 18. The power connector 26 is for supplying wall power to the system 12 and may additionally or alternatively include one or more batteries located in the enclosure 16. The amplifier 28 amplifies the processed audio signal 20 for output at the speaker 18. The non-volatile memory 30 can store settings, calibration audio frequency values, and other information for use by the controller 24.

The audio system 12 further includes a wireless personal area network interface 32 connected to the controller 24. In this embodiment, the wireless personal area network interface 32 is selected for short-range (e.g., <50 m) and low-power wireless communications. As such, the wireless personal area network interface 32 can include a Bluetooth™ Low Energy (BLE) interface, which may also be termed a BTLE, Bluetooth 4.0, or Bluetooth Smart interface.

The wireless mobile device 14 can include a handheld portable device, such as a smartphone, tablet computer, or similar. In this embodiment, the wireless mobile device 14 is of a kind capable of installing and executing applications. The wireless mobile device 14 may be an iPhone™, iPad™, Android™ phone, Android™ tablet, BlackBerry™ device, or the like.

The wireless mobile device 14 includes, among other components, a processor 34, memory 36, a display 38, a wireless personal area network interface 40, and a microphone 42. The processor 34 and memory 36 are capable of storing and executing various applications. The wireless personal area network interface 40 is configured for bidirectional wireless communications 44 with the like interface 32 at the audio system 12. The wireless personal area network interface 40 may be the same type of Bluetooth interface as the interface 32. The microphone 42 is connected to the processor 34 and is capable of capturing audio from the vicinity of the wireless mobile device 14, such as audio 46 outputted by the speaker 18 of the audio system 12, and converting captured audio to electrical signals.

An application executed by the wireless mobile device 14 can be used to control settings and other features of the audio system 12 via bidirectional wireless communications 44 realized by the wireless personal area network interfaces 32, 40.

Figure 2A:
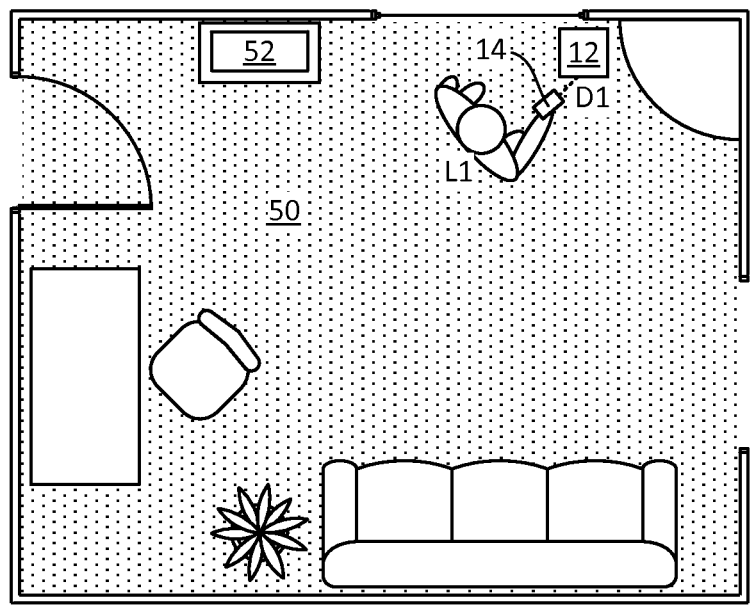
FIGS. 2A-2B are schematic diagrams of an in-room speaker calibration using the system.
Figure 2B:
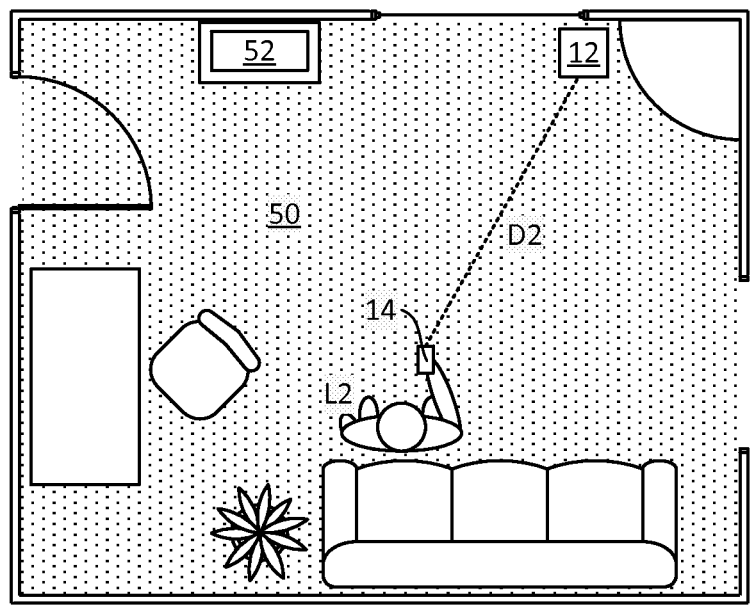

With reference to FIGS. 2A-2B, the wireless mobile device 14 can be configured to assist in calibrating the audio system 12. Specifically, in this embodiment, in which the audio system 12 is a subwoofer, the wireless mobile device 14 can perform an in-room response calibration for the subwoofer.

As is often the case, the subwoofer 12 may be located in a room 50 at a location convenient to the listener. Such a location may be distant from other components 52 of the system, such as other speakers, an audio source, and similar, which may be controlled and/or driven by a common controller, such as the controller 24. Furniture, doors, windows, floor coverings, wall shape and size, and other elements of the room 50 may affect the characteristics of audio outputted by the subwoofer 12. Hence, the location of the subwoofer 12 is not necessarily a suitable acoustic position.

The microphone 42 of the wireless mobile device 14 is designed for functions of the wireless mobile device 14, such as telephone calls, recording videos, recording voice memos, and similar. From the perspective of the audio system 12, the characteristics of the microphone 42 of the wireless mobile device 14 are unknown. This is particularly so because the wireless mobile device 14 and the microphone 42 each may be made by a variety of different manufacturers.

To perform the in-room response calibration for the subwoofer 12 while also ascertaining and compensating for the unknown characteristics of the microphone 42, separate near and far measurements can be performed.

With reference to FIG. 2A, the near measurement is performed by sampling audio outputted by the subwoofer 12 at a location L1 that is a near distance D1 from the subwoofer 12. The distance D1 can be as short as practical, such as directly adjacent the subwoofer 12 to within about 10-80 cm from the subwoofer 12. At the near location L1, the wireless mobile device 14 samples a series of distinct audio frequencies outputted by the subwoofer 12 and determines decibel (dB) values for such. This can be considered a baseline response of the microphone 42 to the subwoofer 12 with negligible effect from the room 50.

With reference to FIG. 2B, the far measurement is performed by sampling audio outputted by the subwoofer 12 at a location L2 that is a far distance D2 from the subwoofer 12. The far location L2 and distance D2 are not particularly limited. The far location L2 can be a normal listening location preferred by the listener. The far distance D2 should be greater than the near distance D1, but is otherwise not restricted. At the far location L2, the wireless mobile device 14 samples the same series of distinct audio frequencies, which are again outputted by the subwoofer 12, to determine decibel values for the far location L2. This can be considered the subwoofer's 12 in-room response as affected by room elements such as furniture, room shape, and the like.

The near and far measurements are then processed to obtain the subwoofer's in-room response with respect to the near measurement. The decibel values obtained during the far measurement are adjusted based on the decibel values obtained during the near measurement. An equalization curve for the subwoofer can thus be obtained, the equalization curve advantageously taking into account both room effects and characteristics of the unknown microphone.

The process discussed with respect to FIGS. 2A-2B can be performed in any order. That is, the near measurement can be conducted before or after the far measurement. More than one far location L2 can be used. In addition, any number of calibration frequencies can be used. In one example, 16 distinct calibration frequencies are used, and 16 samples are captured for each location.

Figure 3:
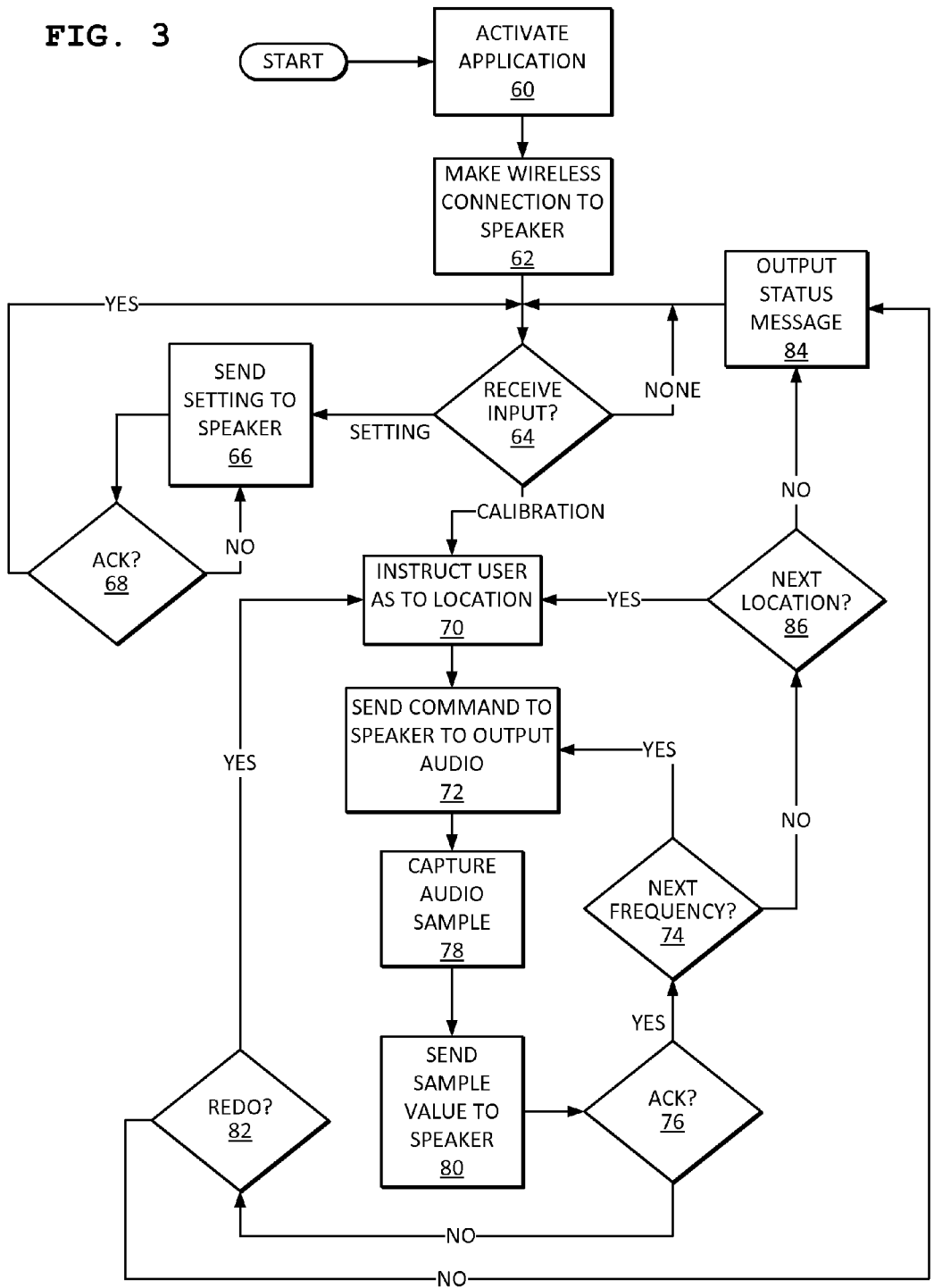
FIG. 3 is a flowchart of a method for a wireless mobile device of the system.

FIG. 3 shows a method for in-room calibration of a speaker, such as the speaker 18 of the audio system 12. The method can be implemented as an application executed by the wireless mobile device 14. The audio system 12 performs a complementary method, and this will be discussed in detail later. For sake of explanation, the method will be described in terms of the systems and components discussed herein. However, the method is not limited to the systems and components discussed herein.

At step 60, an application executed by the wireless mobile device 14 is launched or takes focus, or is otherwise activated.

At step 62, the wireless mobile device 14 wirelessly connects to the audio system 12, which as mentioned above can be a standalone subwoofer. The wireless connection can be realized by the wireless personal area network interfaces 32, 40 of the mobile device 14 and the audio system 12, so that the controller 24 of the audio system 12 and the processor 34 of the mobile device 14 can communicate. Step 62 can include processes such as pairing and bonding. If the audio system 12 was previously paired with the wireless mobile device 14, then a pairing passcode need not be entered by the user. If pairing has not yet been performed, then a default or random pairing code can be used, for instance. In another example, the audio system 12 is factory programmed with a random pairing passcode that is provided with the audio system 12 as, for example, printed on a sticker on the audio system 12 or in the manual. In still another example, a protocol that does not use passcodes, such as Bluetooth Just Works™, can be used.

The wireless mobile device 14 checks for user input at step 64. If a setting of the audio system 12 is to be adjusted, the wireless mobile device 14 receives input of the setting and wirelessly transmits a command to change the setting to the audio system 12, at step 66. Retransmissions can be made based on a check by the wireless mobile device 14 for acknowledgement from the audio system 12, at step 68. Settings can include a low-pass cut-off, parametric equalizer settings (e.g., frequency, bandwidth, and/or gain), a selection of preprogrammed equalizer settings (e.g., normal, music, cinema, night, etc.), volume, phase, delay, and the like.

If an in-room calibration routine is selected at step 64, then the wireless mobile device 14 initiates such, at step 70, by instructing the user to position the wireless mobile device 14 at an initial position, such as the near location L1 (FIG. 2A). The instruction may be displayed as suitable text on the display 38 of the mobile device 14.

When the user affirms that the instructed position has been reached, then the wireless mobile device 14 sends a command to the audio system 12 to initiate output of a first calibration audio frequency, at step 72. Step 72 is repeated for all frequencies of a series of calibration audio frequencies. Transitioning through frequencies, via step 74, based on acknowledgements, at step 76, can be realized by the wireless mobile device 14 wirelessly commanding the audio system 12 to output the next frequency of the series in response to receiving an acknowledgement from the audio system 12 that a sample value of a previously outputted frequency was successfully received from the wireless mobile device 14.

Subsequent to the wireless mobile device 14 commanding the audio system 12 to output a calibration audio frequency, the wireless mobile device 14 uses its microphone 42 to capture a sample of the calibration audio, at step 78. In this embodiment, the sample is a decibel level of the calibration audio. The wireless mobile device 14 need not capture raw audio, rather only the decibel level need be measured. However, this is not limiting and capturing raw audio or determining other characteristics of the calibration audio may be performed.

After capturing the sample, the wireless mobile device 14 wirelessly transmits a representation of the sample the audio system 12. The wireless personal area network interface 40 of the mobile device 14 sends such a representation to the wireless personal area network interface 32 for use by the controller 24 of the audio system 12. In this embodiment, numerical values of decibel levels are transmitted. Values can be transmitted as data payloads of packets that accord with a protocol, such as a protocol compatible with BLE.

If the wireless mobile device 14 fails to receive an acknowledgement for any sample value from the audio system, the wireless mobile device 14 can issue a prompt to the user to determine whether the user wishes to redo the calibration, at step 82. If the user selects to restart the calibration routine, then the method returns to step 70. If the user aborts the calibration process, then a suitable status message is displayed to the user, at step 84. Such a message may indicate that the calibration was unsuccessful and may further include an option to restart the calibration process.

After all frequencies of the series of calibration audio frequencies for the current location are processed, the wireless mobile device 14 determines whether measurement is to be performed at another location, at step 86. For example, if the initial location is the near location L1 (FIG. 2A), then step 86 may determine that the next location is the far location L2 (FIG. 2B). Location measurements may be performed in any order and any number of locations may be processed.

After all locations are processed, step 84 outputs a suitable status message to the user via the display of the wireless mobile device 14. Such a message may indicate that the calibration was successful and may further include details or data of the calibration.

In another embodiment, steps 72-80 may operate in a batched fashion, so that several sample values are sent to the audio system 12 together.

Figure 4:
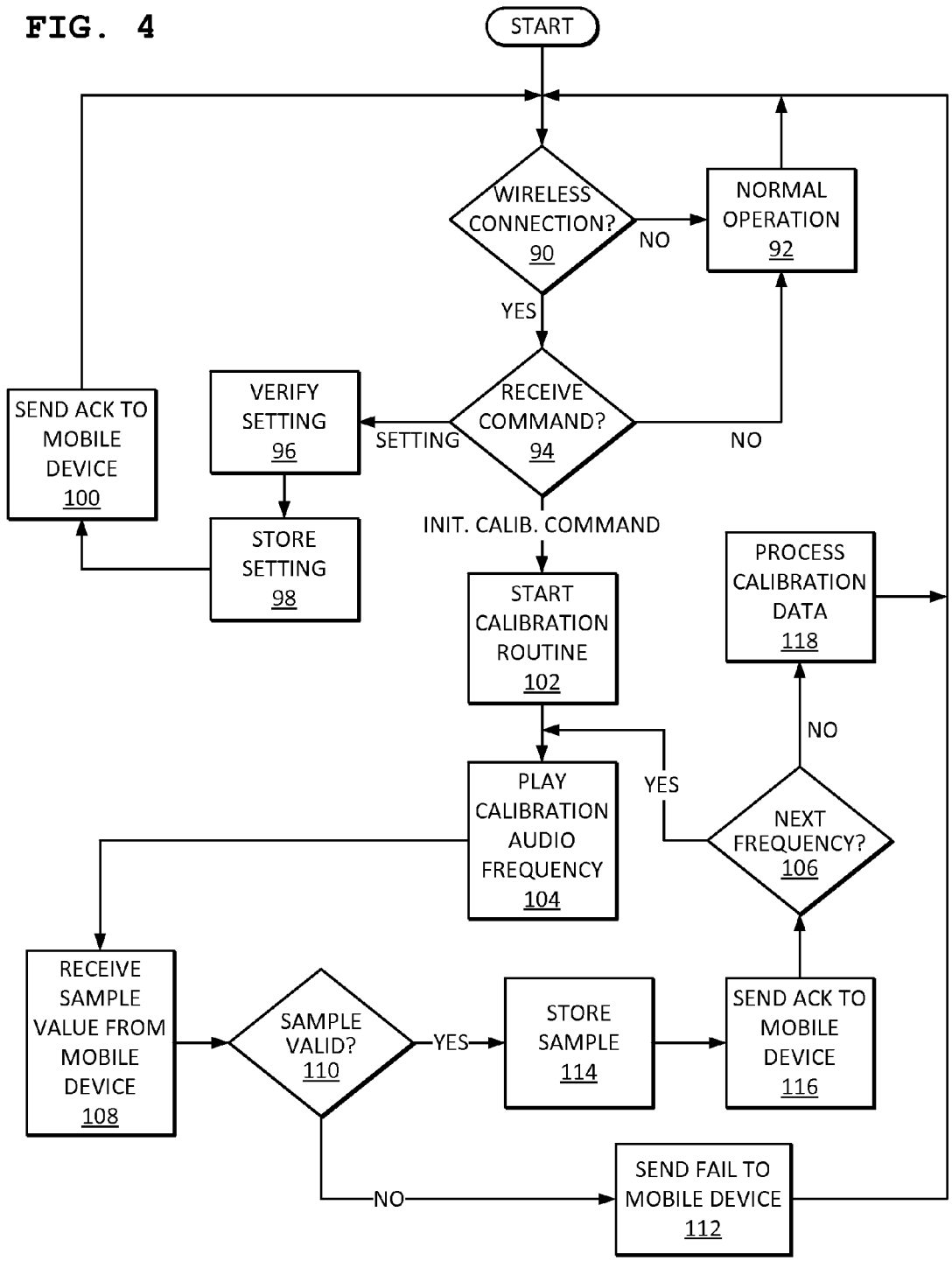
FIG. 4 is a flowchart of a method for a speaker of the system.

FIG. 4 shows a method for in-room calibration of a speaker, such as the speaker 18 of the audio system 12. The method can be implemented as a program, process, or other routine stored in the memory 30 executable by the controller 24 of the audio system 12. The wireless mobile device 14 performs a complementary method, as discussed above. For sake of explanation, the method will be described in terms of the systems and components discussed herein. However, the method is not limited to the systems and components discussed herein.

At step 90, the audio system 12, which as mentioned above can be a standalone subwoofer, wirelessly connects to the wireless mobile device 14. The wireless connection can be realized by the wireless personal area network interfaces 32, 40 of the mobile device 14 and the audio system 12, so that the controller 24 of the audio system 12 and the processor 34 of the mobile device 14 are communicatively coupled. This can include any of pairing, bonding, and other processes discussed above with respect to step 62 (FIG. 3).

If the wireless connection is unavailable, the audio system 12 continues to perform normal audio operations, such as outputting audio, at step 92. Normal operations of the audio system 12 are not interrupted by the check of step 90.

When the wireless connection is available and a command is received from the wireless mobile device 14, at step 94, the audio system 12 determines whether the command relates to the update of a setting or to the initiation of calibration. Determining whether commands are received does not interrupt normal operations of the audio system 12.

Commands to update settings are verified as well-formed and authorized, at step 96, before being stored in the memory 30 of the audio system 12, at step 98. Once a setting is successfully updated, the audio system 12 sends an acknowledgement to the wireless mobile device 14, at step 100.

A command received from the mobile device 14 to initiate calibration causes the controller 24 of the audio system 12 to start its calibration routine, at step 102.

Next, at step 104, the controller 24 controls the speaker 18 to output a calibration audio frequency. This may be triggered by a command received from the wireless mobile device 14. The command may indicate that a next frequency of a series is to be output, where the specific frequency values are stored in the memory 30 of the audio system 12. The method progresses through all frequencies of the series, repeating the series for each location measured (FIG. 3), via a check at step 106. Step 106 can include waiting for a command from the wireless mobile device 14 for output of the next frequency. Alternatively, commands received from the wireless mobile device 14 may specify the particular frequency to output and calibration routine can be configured to respond to such commands by outputting the requested frequency.

It may be advantageous for the calibration audio frequency series to be stored at the audio system 12. Maintaining a multitude of applications for various types of wireless mobile devices and operating system versions thereof can be cumbersome. Hence, storing calibration audio frequency series at the memory 30 of the audio system 12 can reduce the complexity of the applications and the work required to maintain and update them. The same applies for logic of the calibration routine. It may be advantageous to store as much calibration logic in the memory 30 of the audio system 12 as practical, as opposed to storing such at the wireless mobile device 14.

After outputting a particular audio frequency, at step 108, the audio system 12 wirelessly receives the respective sample value from the mobile device 14. The sample value may be the decibel level as determined by the microphone 42 of the mobile device 14.

The sample value can be checked for validity (e.g., within an expected range), at step 110. If the sample value is invalid or a sample value was not received (e.g., before a predetermined timeout), then the audio system 12 can wirelessly transmit a failure indication to the mobile device 14, at step 112, before halting the calibration routine.

If the sample is acceptable, then the audio system 12 can store the sample value in memory 30, at step 114. A specific data structure or set of memory locations can be used such that each sample value is stored appropriately, so that samples for the various frequencies and measurement locations are suitably organized.

The audio system 12 can send an acknowledgement to the wireless mobile device 14, at step 116, for each sample value successfully received and stored.

After sample values for all frequencies have been received and stored, the controller 24 of the audio system 12 processes the sample values to obtain calibration data, at step 118. The calibration data is obtained by comparing near and far sample values for the same frequency. While it is expected that the near values will have higher (i.e., louder) decibel values than the far values, a curve defined by the far values is generally expected to conform to the shape of a curve defined by the near values. Hence, in an ideal environment, the curves of near and far values would be offset from each other but would have similar or identical shapes. However, room features may affect the various far values differently. That is, a particular frequency may be more affected by a piece of furniture than another frequency. The ideal is seldom reached in actual use. Hence, it is expected that, in many environments, the far-value curve will significantly deviate from the shape of the near-value curve.

Figure 5:
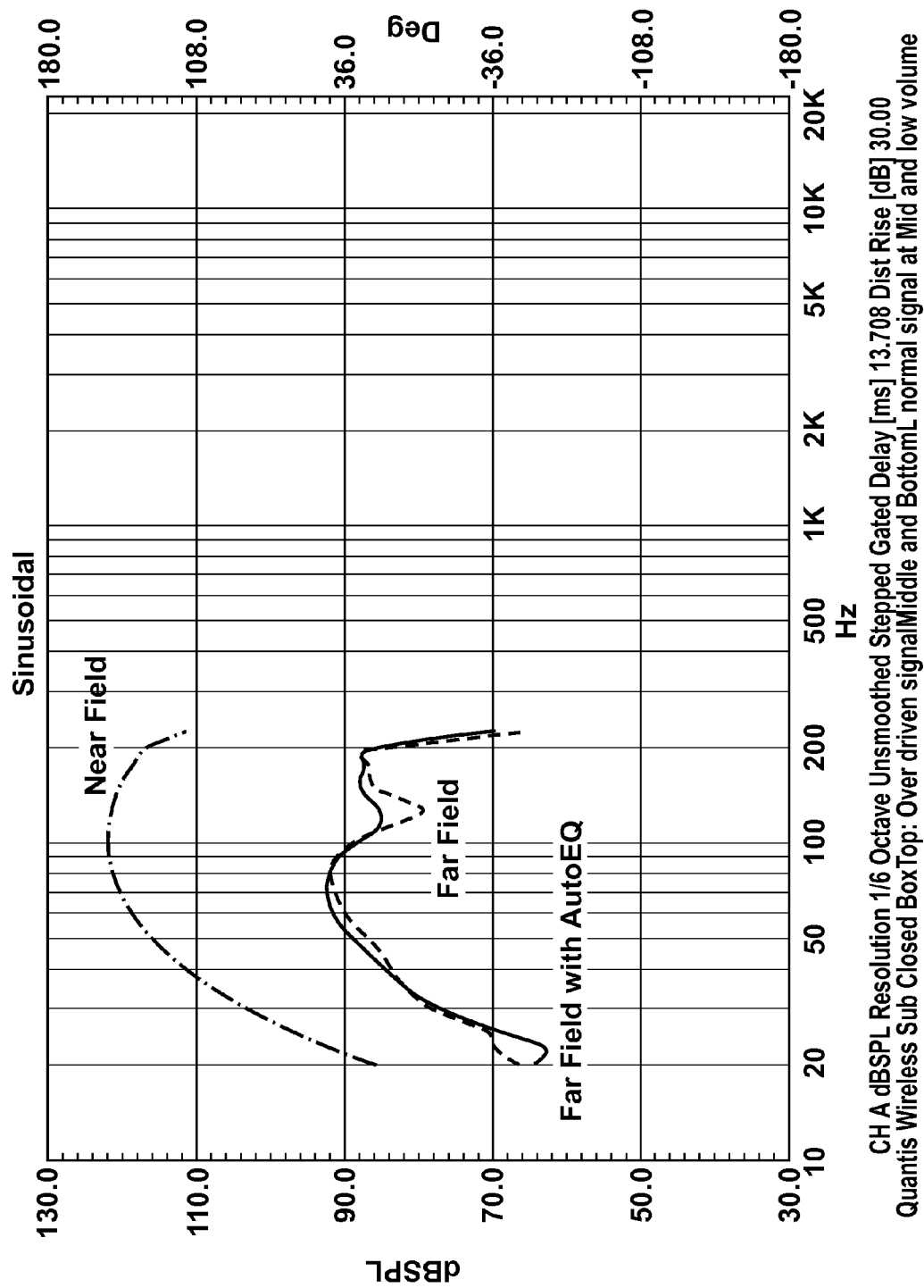
FIG. 5 is an example graph of a calibration.

Processing the sample values, at step 118, can thus include fitting the far-value curve to the shape of the near-value curve. Any curve-fitting methodology can be used. An example is shown in FIG. 5. The near-value (field) curve is at a higher decibel level than the far-value (field) curve. Far values are corrected to better conform to the shape of the near-value curve to arrive at a calibrated curve ("Far Field with AutoEQ"). That is, a particular far value may be increased and another far value may be decreased, while still another far value may be kept unadjusted. Correction values are stored at the audio system 12 as the calibration data. The calibration data can be stored in the memory 30 and/or in memory of the DSP 25 for use during equalization of speaker output.

Limitations can be placed on the correction values. For example, a maximum correction can be set, such that a far value will not be changed (+/−) more than a specific amount. An example of a maximum correction is 6.0 dB. For corrections determined tio be greater than the maximum, the maximum is used. Additionally or alternatively, a minimum correction can be set, such that a far value will not be changed (+/−) unless the value of the change is greater than or equal to the minimum correction. An example of a maximum correction is 2.0 dB.

Figure 6A:
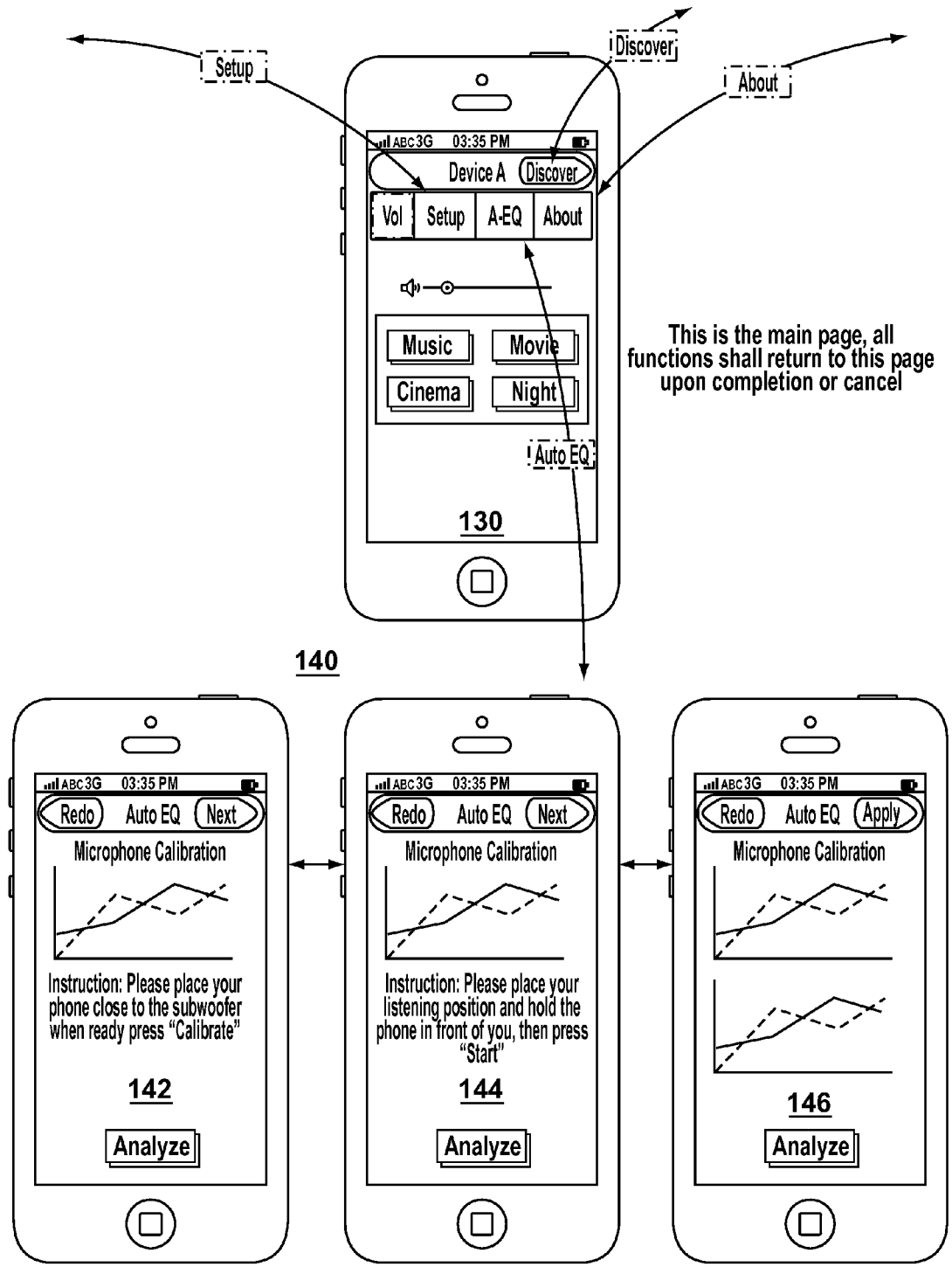
FIGS. 6A-6C are schematic diagrams showing user interfaces for the wireless mobile device and controllable settings of the speaker.
Figure 6B:
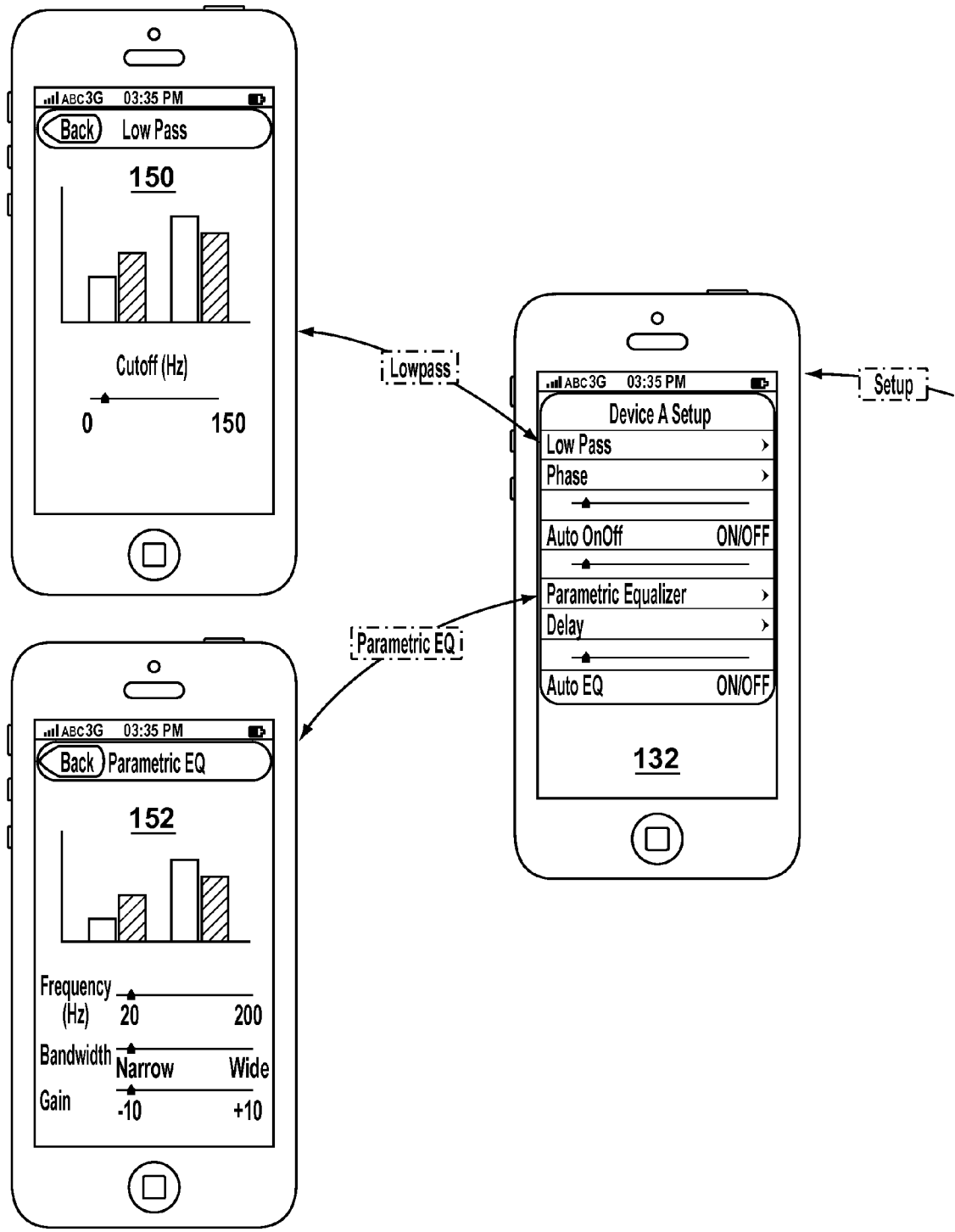
Figure 6C:
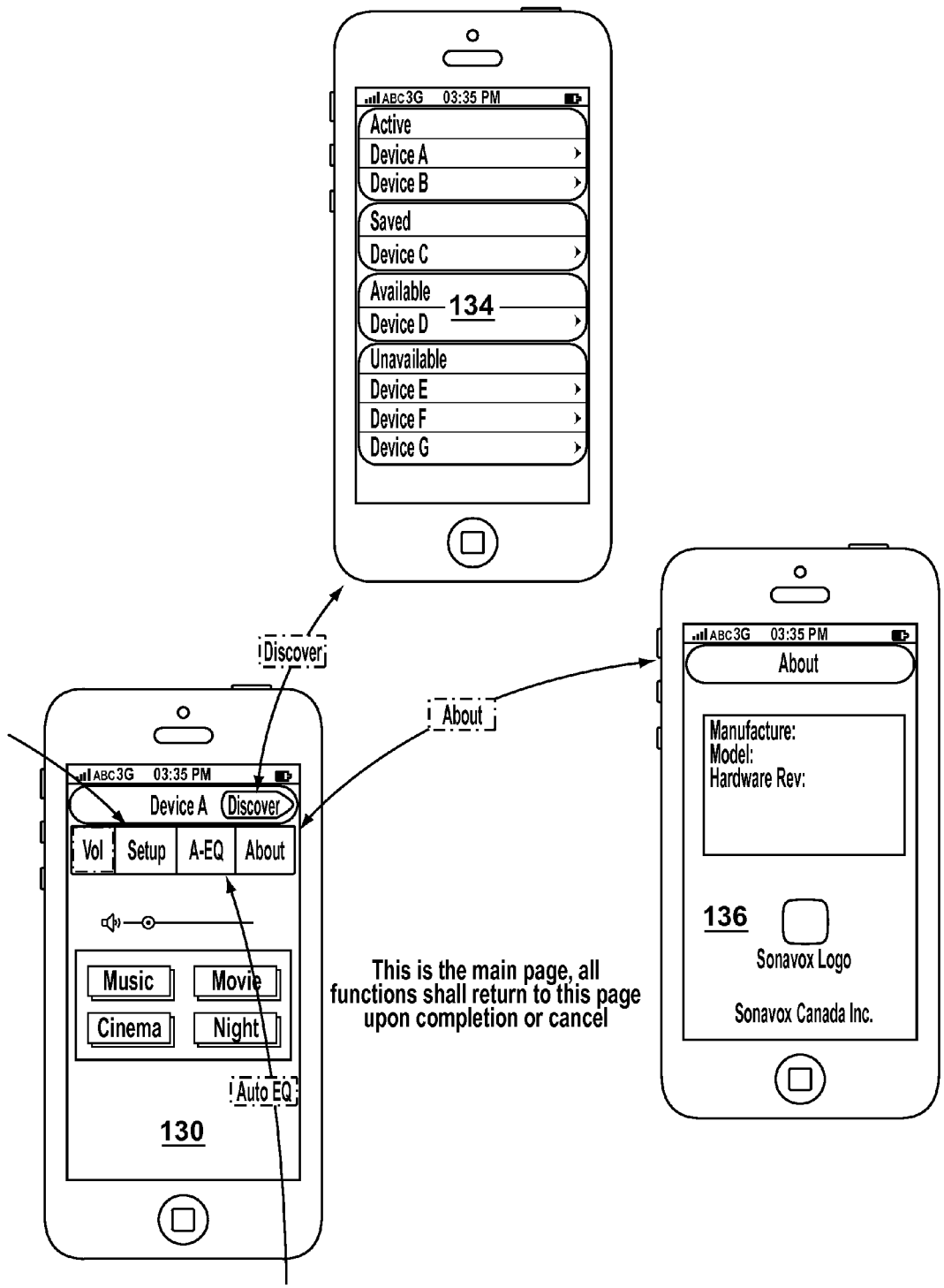

FIGS. 6A-6C are schematic diagrams showing user interfaces for the wireless mobile device 14 and controllable settings of the audio system 12, as well as calibration output. The user interfaces can be implemented by an application executable on the wireless mobile device 14. Transitions between the user interfaces are also shown.

With reference to FIG. 6A, a main interface 130 provides controls for selection of a preprogrammed equalizer and volume, as well as controls to transition to a setup interface 132, a discover interface 134, an about interface 136, and an automatic equalization ("Auto EQ") interface 140.

The automatic equalization interface 142 provides for performance of the calibration discussed herein (FIG. 3) by the wireless mobile device 14. A near-location interface 142 instructs the user to locate the device 14 near the audio system 12. After processing of near samples, a far-location interface 144 instructs the user to position the device 14 at a listing location. After processing of far samples, an equalization interface 146 allows the user to accept the calibration and its correction values for use during equalization of output of the audio system 12. Near, far, and corrected decibel values may be displayed at the interfaces 142-146 as, for example, graphs of such.

With reference to FIG. 6B, the setup interface 132 provides for adjustment of settings such as phase, delay, and whether automatic equalization is active or not. The setup interface 132 can provide sub-interfaces for adjustment of a low-pass cut-off setting 150 and adjustment of parametric equalizer settings 152.

With reference to FIG. 6C, the discover interface 134 can provide for monitoring and control of stored wireless connection settings and the about interface 136 can provide information about the application and the audio system 12.

Numerous advantages of the present invention should be apparent from the above. Not only can an audio system, such as a standalone subwoofer, be wirelessly controlled in a convenient and power-efficient manner, calibration of the audio system can be conveniently and accurately performed. Output of the audio system can be analysed using near and far measurements to account for microphone characteristics and in-room response. The characteristics of the measuring microphone need not be known ahead of time, and no special requirements are placed on the type and quality of the microphone.

While the foregoing provides certain non-limiting example embodiments, it should be understood that combinations, subsets, and variations of the foregoing are contemplated. The monopoly sought is defined by the claims.

What is claimed is:

1. An audio system comprising;
an enclosure;
a speaker disposed in the enclosure;
an audio source for providing an audio signal;
a controller at the enclosure, the controller connected to the speaker and configured to drive the speaker according to the audio signal; and
a wireless personal area network interface connected to the controller;
the controller being configured to communicate via the wireless personal area network interface with an application executed by a wireless mobile device that includes a microphone, the application being configured to control the microphone to sample calibration audio outputted by the speaker during an in-room calibration routine executed by the controller;
wherein the controller stores the in-room calibration routine and the controller is configured to execute the in-room calibration routine in response to a command received from the application via the wireless personal area network interface, the, in-room calibration routine including wirelessly receiving representations of samples of calibration audio from the application via the wireless personal area network interface and generating calibration data therefrom, and wherein the controller is configured to perform equalization on the audio signal according to the calibration data generated by the in-room calibration routine and stored at the controller.

2. The system of claim 1, wherein the wireless mobile device is a smartphone or a tablet computer.

3. The system of claim 1, wherein the wireless personal area network interface comprises a Bluetooth Low Energy interface.

4. The system of claim 1, wherein the in-room calibration routine comprises a near measurement and a far measurement, the near measurement for ascertaining an audio response of a microphone of a wireless mobile device, the far measurement for determining in-room response of the speaker with respect to the near measurement.

5. The system of claim 1, further comprising at least one other speaker connected to the controller, the controller further configured to drive the at least one other speaker.

6. The system of claim 1, wherein the speaker is a subwoofer.

7. A method for in-room calibration of a speaker, the method comprising:
wirelessly connecting a controller at an enclosure of the speaker to a wireless mobile device over a wireless network;
the controller executing an in-room calibration routine, which is stored at the controller, in response to a command received via the wireless network from an application at the wireless mobile device, the in-room calibration routine controlling the speaker to output calibration audio;
a microphone of the wireless mobile device sampling the calibration audio and wirelessly transmitting representations of samples of the calibration audio to the controller; and
the in-room calibration routine at the controller generating calibration data from the wirelessly received representations of the samples and storing the calibration data at the controller for performing equalization for the speaker.

8. The method of claim 7, wherein the controller executing an in-room calibration routine comprises:
controlling the speaker to outputting the calibration audio when the wireless mobile device is situated at a location at a near distance to the speaker; and
controlling the speaker to outputting when the wireless mobile device is situation at a location at a far distance from the speaker, the far distance being greater than the near distance.

9. The method of claim 8, further comprising the wireless mobile device issuing a user instruction to move the wireless mobile device from the near distance to the far distance.

10. An audio system comprising:
an enclosure;
a speaker disposed in the enclosure;
an audio source for providing an audio signal;
a controller at the enclosure, the controller connected to the speaker and configured to drive the speaker according to the audio signal; and
a wireless personal area network interface connected to the controller, the wireless personal area network interface including a Bluetooth Low Energy interface;
the controller being configured to communicate via the wireless personal area network interface with an application executed by a wireless mobile device that includes a microphone, the application being configured to control the microphone to sample calibration audio outputted by the speaker during an in-room calibration routine executed by the controller;
the controller storing the in-room calibration routine and the controller further configured to execute the in-room calibration routine in response to a command received from the application via the wireless personal area network interface, the in-room calibration routine including wirelessly receiving representations of samples of calibration audio from the application via the wireless personal area network interface and generating calibration data therefrom;

the controller further configured to perform equalization on the audio signal according to the calibration data generated by the in-room calibration routine and stored at the controller;

the in-room calibration routine comprising a near measurement and a far measurement, the near measurement for ascertaining an audio response of the microphone of the wireless mobile device, the far measurement for determining in-room response of the speaker with respect to the near measurement.

* * * * *